US005478432A

United States Patent [19]

Vester

[11] Patent Number: 5,478,432

[45] Date of Patent: Dec. 26, 1995

[54] WALLPAPER BORDER APPLICATOR APPARATUS

[76] Inventor: Raita E. Vester, Rte. 4, Box 246J, Nashville, N.C. 27856

[21] Appl. No.: 357,594

[22] Filed: Dec. 16, 1994

[51] Int. Cl.$^6$ .............................. B32B 31/00

[52] U.S. Cl. .............................. 156/574; 156/523; 156/579

[58] Field of Search .............................. 156/71, 523, 524, 156/534, 574, 575, 577, 579

[56] References Cited

U.S. PATENT DOCUMENTS

| | | | |
|---|---|---|---|
| D. 282,622 | 2/1986 | Bobo . | |
| 3,979,242 | 9/1976 | Holland et al. . | |
| 4,711,682 | 12/1987 | Barbe et al. . | |
| 4,806,184 | 2/1989 | Shannon | 156/579 X |
| 5,040,483 | 8/1991 | Lieberman . | |
| 5,050,306 | 9/1991 | Renaud . | |
| 5,280,869 | 1/1994 | Ricci | 248/309.2 |
| 5,403,430 | 4/1995 | Araujo et al. | 156/575 X |

*Primary Examiner*—James Engel

[57] ABSTRACT

A wallpaper border applicator apparatus includes a base assembly which includes a first longitudinal axis. A link assembly includes a longitudinal proximal end, a transverse intermediate portion, and a longitudinal distal end which includes a second longitudinal axis. The longitudinal proximal end is rotatably connected to the base assembly. A spool-receiver assembly is connected to the longitudinal distal end of the link assembly and is adapted to receive and carry a spool of wallpaper. The first longitudinal axis and the second longitudinal axis are substantially parallel and substantially co-planar. The spool-receiver assembly includes a cup portion, an aperture-containing floor portion, a fence portion which includes a guide slot adapted to guide wallpaper as it is uncoiled from a spool of wallpaper, and a spool shaft supported by the longitudinal distal end of the link assembly and adapted to fit into a hollow core of the spool of wallpaper. A ruler portion is arrayed on the spool shaft. A tack-applier assembly is connected to the base assembly and includes an extensible and retractable tack adapted to be pushed out of the base assembly and penetrate through the wall surface so that the tack temporarily supports the segment of applied wallpaper and the applicator apparatus on the wall surface. A level assembly is connected to the base assembly and indicates vertical orientation. A lock assembly is adapted to lock the link assembly in either a selected left orientation or right orientation.

10 Claims, 3 Drawing Sheets

FIG 5
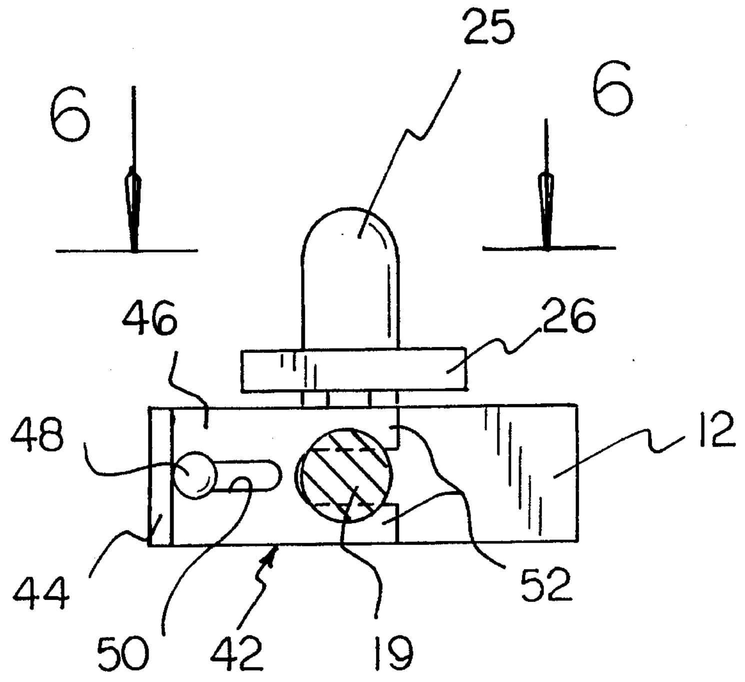
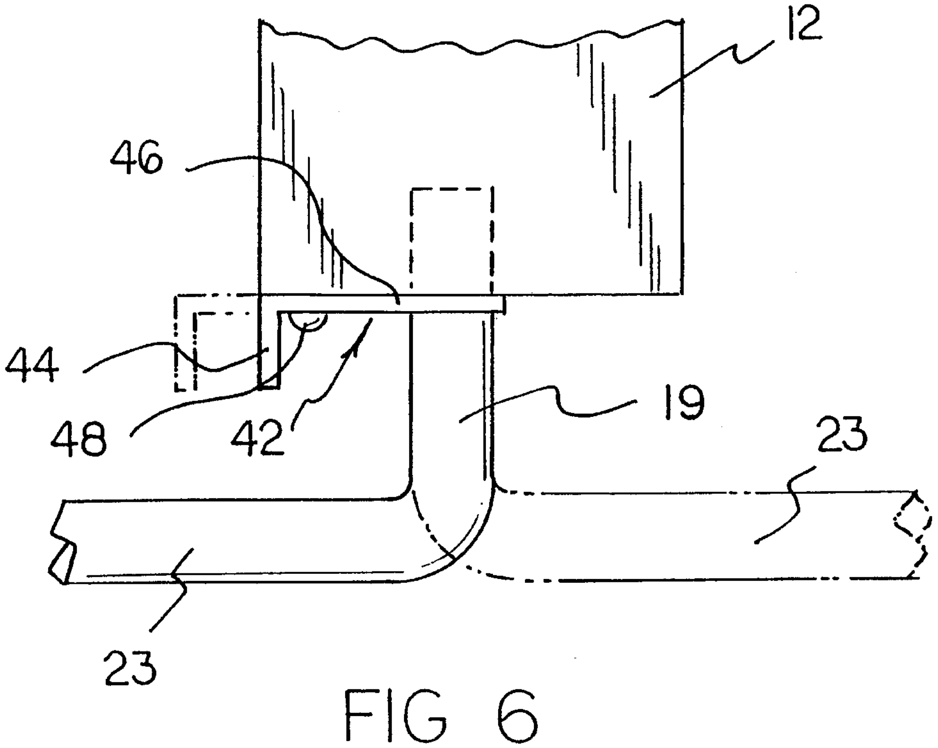
FIG 6

WALLPAPER BORDER APPLICATOR APPARATUS

BACKGROUND OF THE INVENTION

1. Field of the Invention

The present invention relates generally to devices for installing wall coverings and, more particularly, to devices especially adapted for installing wallpaper.

2. Description of the Prior Art

Wallpaper is a popular form of wall covering. However, there are a number of disadvantages in the conventional use of wallpaper. To be applied, wallpaper is often wet and slippery, and in applying the paper, has water running down the walls and the person applying the paper to the walls. In this respect, it would be desirable if a wallpaper applicator apparatus were provided which prevents water from running down walls and running down the person applying the paper to the walls.

Throughout the years, a number of innovations have been developed relating to applying wallpaper, and the following U.S. patents are representative of some of those innovations: U.S. Pat. Nos. 3,979,242; 4,711,682; 5,040,483; 5,050,306; and Des. 282,622. More specifically, U.S. Pat. No. 3,979,242 discloses a wallpaper dispenser that is adapted to be set on the floor below the region of the wall onto the wallpaper is to applied. Although this device may be helpful for installing vertically oriented strips of wallpaper, this device would not be very useful for installing horizontally oriented strips of wallpaper. In this respect, it would be desirable if a wallpaper applicator apparatus were provided that is useful for installing horizontally oriented strips of wallpaper.

U.S. Pat. No. 4,711,682 discloses a hand-held wallpaper applicator inside of which a roll of wallpaper is biased in a horizontal orientation. As a result, this device is not readily used for installing horizontally oriented wallpaper.

U.S. Pat. No. 5,040,483 discloses a wallpaper tray designed to assure that the wallpaper is properly wetted before being applied to a wall surface. The wallpaper tray is not readily adapted for installing horizontally oriented strips of wallpaper.

U.S. Pat. No. 5,050,306 discloses a wallpaper border marker and cutter device. The device marks walls and trims wallpaper to be used as border wallpaper. However, this device does not actually install border wallpaper. In this respect, it would be desirable if a wallpaper applicator apparatus were provided that provides for installation of border wallpaper both in a vertical and a horizontal orientation.

U.S. Pat. No. Des. 282,622 discloses a T-shaped wallpaper hanger that can be used with strips of wallpaper. However, the device in this patent is not adapted to dispense wallpaper from a coiled roll. In this respect, it would be desirable if a wallpaper applicator apparatus were provided which enabled dispensing border wallpaper from a coiled roll in either a vertical or horizontal orientation.

Still other features would be desirable in a wallpaper border applicator apparatus. For example, when a wet strip of wallpaper has been applied to a wall surface, the wallpaper border applicator is temporarily tacked onto the wall to prevent separation of wet wallpaper from the wall surface and to permit the person using the apparatus to reposition oneself. In this respect, it would be desirable if a wallpaper applicator apparatus were provided with a capability to tack an applicator to a wall surface.

Some people are right-handed and others are left-handed. In this respect, it would be desirable if a wallpaper applicator apparatus were provided which is readily adapted for use by either right-handed or left-handed persons.

In applying wallpaper, some people prefer to move in a right to left direction. Others prefer to apply the wallpaper in a left to right direction. In this respect, it would be desirable if a wallpaper applicator apparatus were provided which is readily adapted to be used for applying wallpaper in either a right to left or left to right direction.

When installing border wallpaper, it is especially important to carefully control the orientation of the paper with respect to edges of the wall. To assist in accurate application, it would be desirable for a wallpaper border applicator apparatus to have a ruler surface so that measurements of distance can be readily measured and monitored.

To help prevent excess water from dripping from a roll of wet wallpaper onto the wall surface or onto a person installing the wallpaper, it would be desirable if a wallpaper applicator apparatus included a cup for catching excess water from a wet roll of wallpaper.

A roll of border wallpaper may be relatively long, e.g. 15 feet long. Generally individual pieces of border wallpaper must be cut off of the roll for installation to take place. Moreover, generally a person must be assisted by another person to install the individual pieces of border wallpaper. In this respect, it would be desirable if a device were provided which enables a person to install a complete roll of border wallpaper without being assisted by another person and without having to cut the border wallpaper into lengths that then have to be matched.

Thus, while the foregoing body of prior art indicates it to be well known to use devices for applying wallpaper to walls, the prior art described above does not teach or suggest a wallpaper applicator apparatus which has the following combination of desirable features: (1) prevents water from running down walls and running down the person applying the paper to the walls; (2) is used for installing horizontally oriented strips of wallpaper; (3) provides for installation of border wallpaper both in a vertical and a horizontal orientation; (4) enables dispensing border wallpaper from a coiled roll in either a vertical or horizontal orientation; (5) has a capability to tack an applicator to a wall surface; (6) is readily adapted for use by either right-handed or left-handed persons; (7) is readily adapted to be used for applying wallpaper in either a right to left or left to right direction; (8) has a ruler surface so that measurements of distance can be readily measured and monitored; and (9) enables a person to install a complete roll of border wallpaper without being assisted by another person and without having to cut the border wallpaper into lengths that then have to be matched. The foregoing desired characteristics are provided by the unique wallpaper border applicator apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a wallpaper border applicator apparatus which includes a base assembly having a first longitudinal axis. A link assembly includes a longitudinal proximal end, a transverse intermediate portion, and a longitudinal distal end which includes a second longitudinal axis. The longitudinal proximal end is rotatably is connected to the base assembly, and a spool-receiver assembly is connected to the longitudinal distal end of the link assembly. The spool-receiver assembly is adapted to receive and carry a spool of wallpaper. The first longitudinal axis and the second longitudinal axis are substantially parallel and substantially co-planar.

The spool-receiver assembly includes a cup portion supported by the longitudinal distal end of the link assembly. An aperture-containing floor portion is supported by the cup portion. A fence portion is supported by the cup portion. The fence portion includes a guide slot adapted to guide wallpaper as it is uncoiled from a spool of wallpaper, and a spool shaft is supported by the longitudinal distal end of the link assembly. The spool shaft is adapted to fit into a hollow core of the spool of wallpaper. The longitudinal proximal end of the link assembly and the spool shaft are formed as a unified, integrated structure.

A ruler portion is arrayed on the spool shaft. The cup portion and the fence portion of the spool-receiver assembly are formed as a unified, integrated structure. A tack-applier assembly is connected to the base assembly. The tack-applier assembly includes a tack adapted to be pushed out of the base assembly and penetrate into a wall surface supporting the segment of wallpaper and applicator. The tack-applier assembly also includes a pressure button, supported by the base assembly, which is adapted to receive and transmit pressure to the tack for driving the tack into the wall surface.

A level assembly is connected to the base assembly. The level assembly is adapted to indicate when the first longitudinal axis of the base assembly is oriented vertically.

A lock assembly is supported by the base assembly. The lock assembly is adapted to lock the link assembly in either a selected left orientation or right orientation. The lock assembly includes a lock handle portion, a slotted-plate controlled by the lock handle portion, a stop pin supported the base assembly and inserted through a slot in the slotted-plate, and a jaw portion connected to the slotted-plate. The jaw portion is adapted to grab a portion of the longitudinal proximal end of the link assembly for locking the link assembly in a selected right or left orientation with respect to the base assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wallpaper border applicator apparatus which has all of the advantages of the prior art and none of the disadvantages.

It is another object of the present invention to provide a new and improved wallpaper border applicator apparatus which may be easily and efficiently manufactured and marketed.

It is a further object of the present invention to provide a new and improved wallpaper border applicator apparatus which is of durable and reliable construction.

An even further object of the present invention is to provide a new and improved wallpaper border applicator apparatus which is susceptible of a low cost of manufacture with regard to both materials and labor, and which accordingly is then susceptible of low prices of sale to the consuming public, thereby making such wallpaper border applicator apparatus available to the buying public.

Still yet a further object of the present invention is to provide a new and improved wallpaper border applicator apparatus which prevents water from running down walls and running down the person applying the paper to the walls.

Still another object of the present invention is to provide a new and improved wallpaper border applicator apparatus that is used for installing horizontally oriented strips of wallpaper.

Yet another object of the present invention is to provide a new and improved wallpaper border applicator apparatus which provides for installation of border wallpaper both in a vertical and a horizontal orientation.

Even another object of the present invention is to provide a new and improved wallpaper border applicator apparatus that enables dispensing border wallpaper from a coiled roll in either a vertical or horizontal orientation.

Still a further object of the present invention is to provide a new and improved wallpaper border applicator apparatus which has a capability to be tacked to a wall surface.

Yet another object of the present invention is to provide a new and improved wallpaper border applicator apparatus that is readily adapted for use by either right-handed or left-handed persons.

Still another object of the present invention is to provide a new and improved wallpaper border applicator apparatus which is readily adapted to be used for applying wallpaper in either a right to left or left to right direction.

Yet another object of the present invention is to provide a new and improved wallpaper border applicator apparatus that has a ruler surface so that measurements of distance can be readily measured and monitored.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a partial cross-sectional view of the embodiment of the invention shown in FIG. 1 taken along line 5—5 of FIG. 1.

FIG. 6 is a partial cross-sectional view of the embodiment of the invention shown in FIG. 5 taken along line 6—6 of FIG. 5.

DESCRIPTION OF THE PREFERRED EMBODIMENT

With reference to the drawings, a new and improved wallpaper border applicator apparatus embodying the principles and concepts of the present invention will be described.

Figure 1:
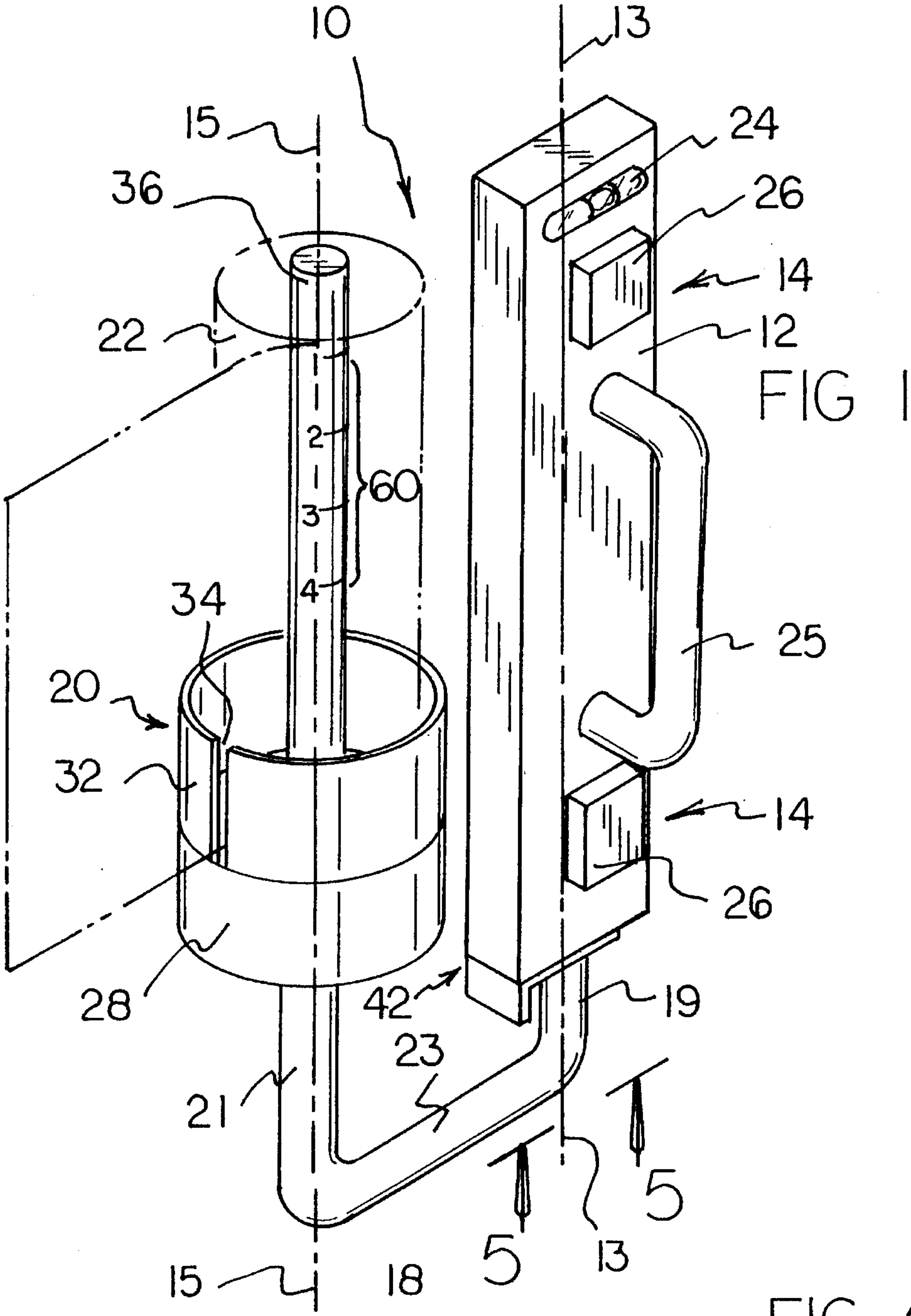
FIG. 1 is a perspective view showing a preferred embodiment of the wallpaper border applicator apparatus of the invention.
Figure 2:
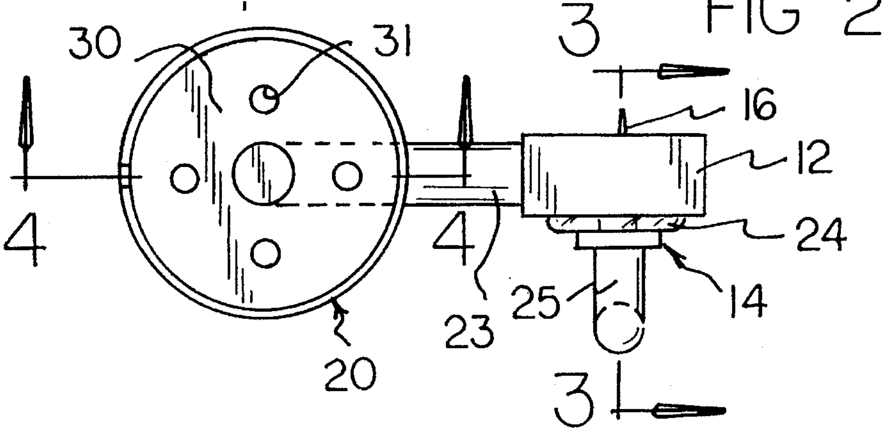
FIG. 2 is a top view of the embodiment of the wallpaper border applicator apparatus shown in FIG. 1.
Figure 3:
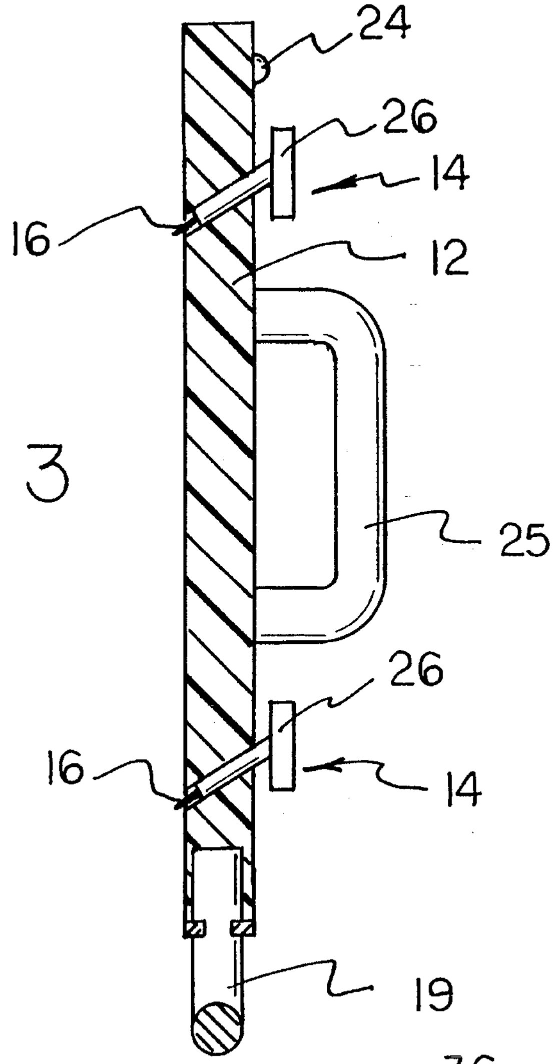
FIG. 3 is an enlarged cross-sectional view of the embodiment of the wallpaper border applicator apparatus of FIG. 2 taken along line 3—3 thereof.
Figure 4:
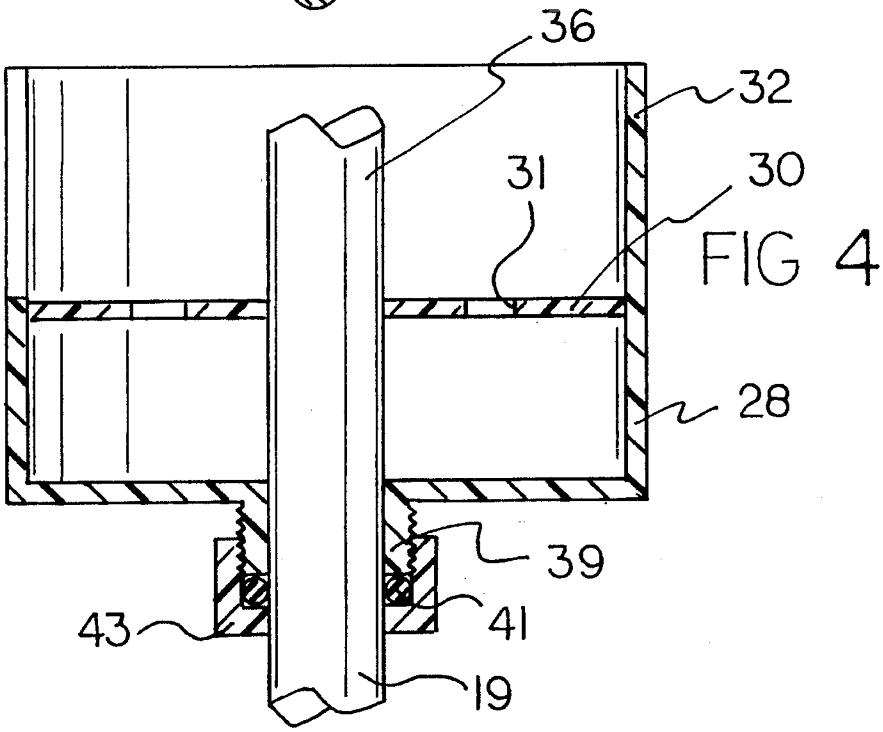
FIG. 4 is an enlarged cross-sectional view of the embodiment of the wallpaper border applicator apparatus of FIG. 2 taken along line 4—4 thereof.

Turning to FIGS. 1–6, there is shown an exemplary embodiment of the wallpaper border applicator apparatus of the invention generally designated by reference numeral 10. In its preferred form, wallpaper border applicator apparatus 10 includes a base assembly 12 which includes a first longitudinal axis 13. A link assembly 18 includes a longitudinal proximal end 19, a transverse intermediate portion 23, and a longitudinal distal end 21 which includes a second longitudinal axis 15. The link assembly 18 is a generally U-shaped or J-shaped structure. The longitudinal proximal end 19 is rotatably is connected to the base assembly 12, and a spool-receiver assembly 20 is connected to the longitudinal distal end 21 of the link assembly 18. The spool-receiver assembly 20 is adapted to receive and carry a spool 22 of wallpaper. A handle 25 is connected to the base assembly 12. The first longitudinal axis 13 and the second longitudinal axis 15 are substantially parallel and substantially co-planar.

The spool-receiver assembly 20 includes a cup portion 28 supported by the longitudinal distal end 21 of the link assembly 18. An aperture-containing floor portion 30 is supported by the cup portion 28 and includes apertures 31. A fence portion 32 is supported by the cup portion 28. The fence portion 32 includes a guide slot 34 adapted to guide wallpaper as it is uncoiled from a spool 22 of wallpaper, and a spool shaft 36 is supported by the longitudinal distal end 21 of the link assembly 18. The spool shaft 36 is adapted to fit into a hollow core of the spool 22 of wallpaper. The cup portion 28 includes a downwardly descending portion 39 that has external threads. An O-ring 41 is located adjacent to the downwardly descending portion 39 and is compressed to form a water-tight seal against the longitudinal proximal end 19 of the link assembly 18 by an internally threaded nut 43. The longitudinal proximal end 19 of the link assembly 18 and the spool shaft 36 are formed as a unified, integrated structure.

A ruler portion 60 is arrayed on the spool shaft 36. The cup portion 28 and the fence portion 32 of the spool-receiver assembly 20 are formed as a unified, integrated structure. A tack-applier assembly 14 is connected to the base assembly 12. The tack-applier assembly 14 includes an extensible and retractable tack 16 adapted to be pushed out of the base assembly 12 and penetrate through a wall surface in order to temporarily support the segment of applied wallpaper and the applicator apparatus on the wall surface. The tack-applier assembly 14 also includes a pressure button 26, supported by the base assembly 12, which is adapted to receive and transmit pressure to the tack 16 for driving the tack 16 through the wall surface.

A level assembly 24 is connected to the base assembly 12. The level assembly 24 is adapted to indicate when the first longitudinal axis 13 of the base assembly 12 is oriented vertically. Moreover, when the first longitudinal axis 13 of the base assembly 12 is oriented vertically, the second longitudinal axis 15 and the longitudinal distal end 21 of the link assembly 18 are also oriented vertically.

A lock assembly 42 is supported by the base assembly 12. The lock assembly 42 is adapted to lock the link assembly 18 in either a selected left orientation or right orientation.

The lock assembly 42 includes a lock handle portion 44, a slotted-plate 46 controlled by the lock handle portion 44, a stop pin 48 supported the base assembly 12 and inserted through a slot 50 in the slotted-plate 46, and a jaw portion 52 connected to the slotted-plate 46. The jaw portion 52 is adapted to grab a portion of the longitudinal proximal end 19 of the link assembly 18 for locking the link assembly 18 in a selected right or left orientation with respect to the base assembly 12.

In using the lock assembly 42, the jaw portion 52 is disengaged from the longitudinal proximal end 19 of the link assembly 18 by pushing the lock handle portion 44 to the left as shown in FIG. 6. Then, the link assembly 18 can be rotated to a left position from a right position or vice versa with respect to the base assembly 12. After the link assembly 18 is rotated to the desired orientation, the jaw portion 52 is re-engaged to the longitudinal proximal end 19 of the link assembly 18 by pushing the lock handle portion 44 to the right in FIG. 6.

In using the wallpaper border applicator apparatus 10 of the invention, a person grasps the handle 25, and a roll of wet wallpaper is placed over the spool shaft 36 and rests on the aperture-containing floor portion 30. The border wallpaper is pulled through the guide slot 34 as it is applied to the wall. As the border wallpaper moves through the guide slot 34, excess water is squeezed out of the wallpaper, and the excess water drains through the apertures 31 into the cup portion 28. The ruler portion 60 can be used for properly adjusting the spool-receiver assembly 20 up or down on the longitudinal proximal end 19 of the link assembly 18. The spool-receiver assembly 20 can be adjusted so that the spool 22 resides at the top of the spool shaft 36. Once a strip of wet border wallpaper has been applied to the wall surface, a person can press upon one or more of the pressure buttons 26 to drive the extensible and retractable tack 16 into the wall surface (such as includes an layer of wall board) to allow the applicator apparatus to stay in position while the person applying the border can move forward and reposition oneself without the already installed portions of the border from coming down. In repositioning oneself, it may be especially helpful if the person were on a ladder or chair when ready to proceed with the installation of the border wallpaper. Before continuing with installation of the border wallpaper, the tack 16 is easily retracted and removed from its penetration of the wall surface. This allows one person to work without help. When the tack 16 is retracted from the wall surface, only a small hole remains which can be covered by border wallpaper during then next phase of installation. During installation of the border wallpaper, the wallpaper border applicator apparatus 10 of the invention can be maintained in a vertical orientation by employing the level assembly 24.

The components of the wallpaper border applicator apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved wallpaper border applicator apparatus that is low in cost, relatively simple in design and operation, and which may advantageously be used to prevent water from running down walls and running down the person applying the paper to the walls. With the invention, a wallpaper border applicator apparatus is provided which is used for installing horizontally oriented strips of wallpaper. With the invention, a wallpaper border applicator apparatus provides for installation of border wallpaper both in a vertical and a horizontal orientation. With the invention, a wallpaper border applicator apparatus is provided which enables dispensing border wallpaper from a coiled roll in either a vertical or horizontal orientation. With the invention, a wallpaper border applicator apparatus is provided which has a capability to tack the applicator apparatus to a wall surface. With the invention, a wallpaper border applicator apparatus is provided which is readily adapted for use by either right-handed or left-handed persons. With the invention, a wallpaper border applicator apparatus is provided which is readily adapted to be used for applying wallpaper in either a right to left or left to right direction. With the invention, a wallpaper border applicator apparatus is provided which has a ruler surface so that measurements of distance can be readily measured and monitored.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A wallpaper border applicator apparatus, comprising:

a base assembly which includes a first longitudinal axis, a link assembly which includes a longitudinal proximal end, a transverse intermediate portion, and a longitudinal distal end which includes a second longitudinal axis, wherein said longitudinal proximal end is rotatably connected to said base assembly, a spool-receiver assembly connected to said longitudinal distal end of said link assembly, where said spool-receiver assembly is adapted to receive and carry a spool of wallpaper, and a tack-applier assembly connected to said base assembly, wherein said tack-applier assembly includes an extensible and retractable tack adapted to be pushed out of said base assembly and penetrate through a wall surface such that said tack supports an applied segment of wallpaper and the applicator apparatus on the wall surface.

2. The apparatus of claim 1 wherein said first longitudinal axis and said second longitudinal axis are substantially parallel and substantially co-planar.

3. The apparatus of claim 1 wherein said spool-receiver assembly includes:

a cup portion supported by said longitudinal distal end of said link assembly, an aperture-containing floor portion supported by said cup portion, a fence portion supported by said cup portion, wherein said fence portion includes a guide slot adapted to guide wallpaper as it is uncoiled from a spool of wallpaper, and a spool shaft supported by said longitudinal distal end of said link assembly, wherein said spool shaft is adapted to fit into a hollow core of the spool of wallpaper.

4. The apparatus of claim 3 wherein said longitudinal proximal end of said link assembly and said spool shaft are formed as a unified, integrated structure.

5. The apparatus of claim 3 wherein said cup portion and said fence portion of said spool-receiver assembly are formed as a unified, integrated structure.

6. The apparatus of claim 1, further including:

a ruler portion arrayed on said spool shaft.

7. The apparatus of claim 1 wherein said tack-applier assembly also includes a pressure button, supported by said base assembly, which is adapted to receive and transmit pressure to said tack for driving said tack into the wall surface.

8. The apparatus of claim 1, further including:

a level assembly connected to said base assembly, wherein said level assembly is adapted to indicate when said first longitudinal axis of said base assembly is oriented vertically.

9. A wallpaper border applicator apparatus, comprising:

a base assembly which includes a first longitudinal axis, a link assembly which includes a longitudinal proximal end, a transverse intermediate portion, and a longitudinal distal end which includes a second longitudinal axis, wherein said longitudinal proximal end is rotatably connected to said base assembly, a spool-receiver assembly connected to said longitudinal distal end of said link assembly, where said spool-receiver assembly is adapted to receive and carry a spool of wallpaper, and a lock assembly supported by said base assembly, wherein said lock assembly is adapted to lock said link assembly in either a selected left orientation or right orientation.

10. A wallpaper border applicator apparatus, comprising:

a base assembly which includes a first longitudinal axis, a link assembly which includes a longitudinal proximal end, a transverse intermediate portion, and a longitudinal distal end which includes a second longitudinal axis, wherein said longitudinal proximal end is rotatably connected to said base assembly, a spool-receiver assembly connected to said longitudinal distal end of said link assembly, where said spool-receiver assembly is adapted to receive and carry a spool of wallpaper, and a lock assembly supported by said base assembly, wherein said lock assembly is adapted to lock said link assembly in either a selected left orientation or right orientation, wherein said lock assembly includes, a lock handle portion, a slotted-plate controlled by said lock handle portion, a stop pin supported said base assembly and inserted through a slot in said slotted-plate, and a jaw portion connected to said slotted-plate, wherein said jaw portion is adapted to grab a portion of said longitudinal proximal end of said link assembly for locking said link assembly in a selected right or left orientation with respect to said base assembly.

* * * * *